(12) United States Patent
Sussmann

(10) Patent No.: US 8,800,085 B2
(45) Date of Patent: Aug. 12, 2014

(54) METHOD FOR PRODUCING A SHOE AND SHOE

(75) Inventor: Reinhold Sussmann, Scheinfeld (DE)

(73) Assignee: Puma SE, Herzogenaurach (DE)

( * ) Notice: Subject to any disclaimer, the term of this patent is extended or adjusted under 35 U.S.C. 154(b) by 0 days.

(21) Appl. No.: 13/990,248

(22) PCT Filed: Nov. 7, 2011

(86) PCT No.: PCT/EP2011/005580
§ 371 (c)(1),
(2), (4) Date: Jul. 10, 2013

(87) PCT Pub. No.: WO2012/072177
PCT Pub. Date: Jun. 7, 2012

(65) Prior Publication Data
US 2014/0068879 A1    Mar. 13, 2014

(30) Foreign Application Priority Data
Nov. 30, 2010 (DE) .......................... 10 2010 052 783

(51) Int. Cl.
*A43B 13/42* (2006.01)
*B29D 35/06* (2010.01)
*A43B 13/12* (2006.01)
*B29D 35/00* (2010.01)

(52) U.S. Cl.
CPC .......... *B29D 35/0018* (2013.01); *B29D 35/064* (2013.01); *A43B 13/125* (2013.01); *B29D 35/062* (2013.01); *A43B 13/42* (2013.01)
USPC ...................... 12/142 E; 12/142 RS; 36/30 R

(58) Field of Classification Search
USPC ........... 36/88, 93, 154, 25 R, 30 R; 12/142 E, 12/142 RS
See application file for complete search history.

(56) References Cited

U.S. PATENT DOCUMENTS 2,794,270 A * 6/1957 Dubner .............................. 36/93
3,121,430 A * 2/1964 O'Reilly .......................... 36/154

(Continued)

FOREIGN PATENT DOCUMENTS

DE    26 03 716 B1    12/1976
DE    695 03 139 T2    11/1998

(Continued)

OTHER PUBLICATIONS

International Search Report of PCT/EP2011/005580 dated Feb. 14, 2012.

*Primary Examiner* — Marie Bays
(74) *Attorney, Agent, or Firm* — Lucas & Mercanti, LLP

(57) ABSTRACT

The invention relates to a method for the production of a shoe (1), especially of a sport shoe, with a shoe upper (2) and a midsole (3) which is arranged at the shoe upper. To obtain improved ergonomics of the shoe without disturbance of its appearance the method comprises the steps: a) Production of a shoe upper (2) of the shoe (1), wherein a receiving pocket (4) is arranged at the bottom side of the shoe upper (2), which receiving pocket (4) forms a receiving space (5) for the material of the midsole (3) which receiving space (5) is at least substantially closed; b) Placement of the shoe upper (2) including the receiving pocket (4) in a molding tool (6, 7, 8); c) Pouring or injecting of flowable plastic material into the receiving space (5) of the receiving pocket (4) to form the midsole (3); d) Letting solidify of the poured or injected plastic material; e) Demolding of the shoe upper (2) including receiving pocket (4) and poured or injected midsole (3) from the molding tool (6, 7, 8). Furthermore, the invention relates to a shoe.

6 Claims, 5 Drawing Sheets

(56) References Cited

U.S. PATENT DOCUMENTS

Figure 1:
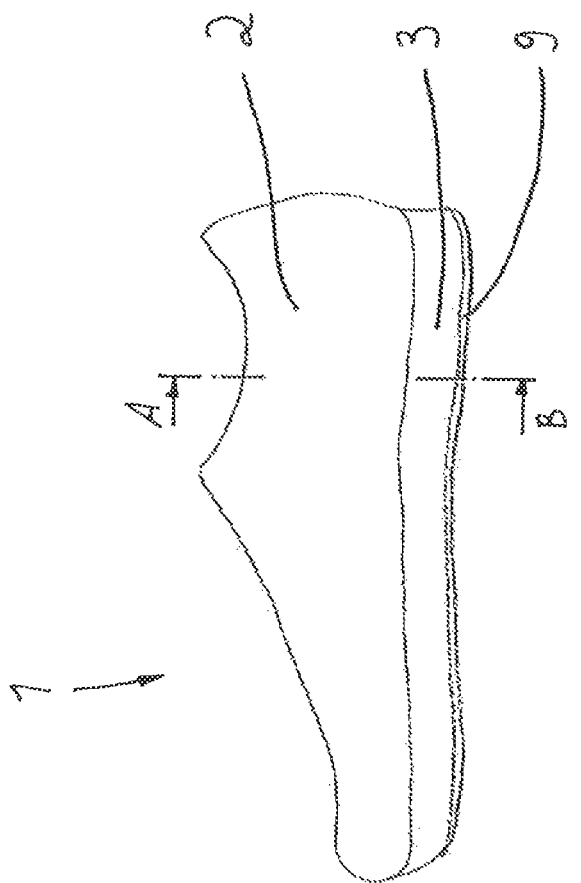

| | | | | |
|---|---|---|---|---|
| 3,929,140 A | * | 12/1975 | Wesberg | 36/154 |
| 4,120,064 A | * | 10/1978 | Salomon | 12/142 R |
| 4,128,951 A | * | 12/1978 | Tansill | 36/44 |
| 4,428,089 A | * | 1/1984 | Dawber et al. | 12/142 R |
| 5,101,580 A | * | 4/1992 | Lyden | 36/93 |
| 5,727,271 A | * | 3/1998 | Romanato et al. | 12/142 RS |
| 5,890,248 A | * | 4/1999 | Gee | 12/146 B |
| 5,979,079 A | * | 11/1999 | Krajcir | 36/35 R |
| 6,026,595 A | * | 2/2000 | Curry | 36/93 |
| 2011/0179668 A1 | * | 7/2011 | Fleming et al. | 36/4 |
| 2011/0247236 A1 | * | 10/2011 | Fleming et al. | 36/88 |

FOREIGN PATENT DOCUMENTS

| | | |
|---|---|---|
| DE | 696 15 274 T2 | 4/2002 |
| FR | 2315236 A1 | 1/1977 |

\* cited by examiner

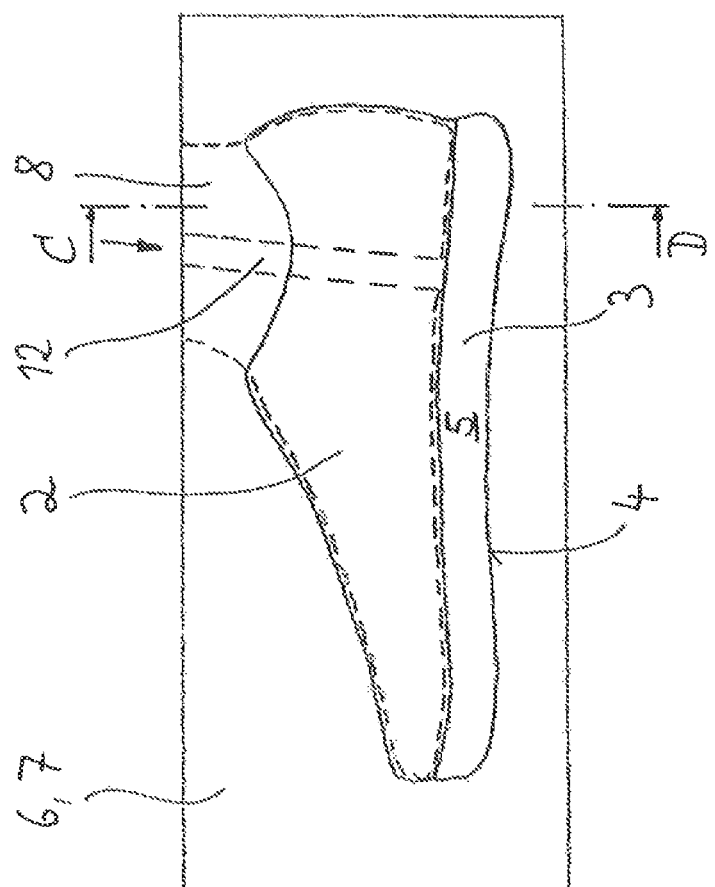

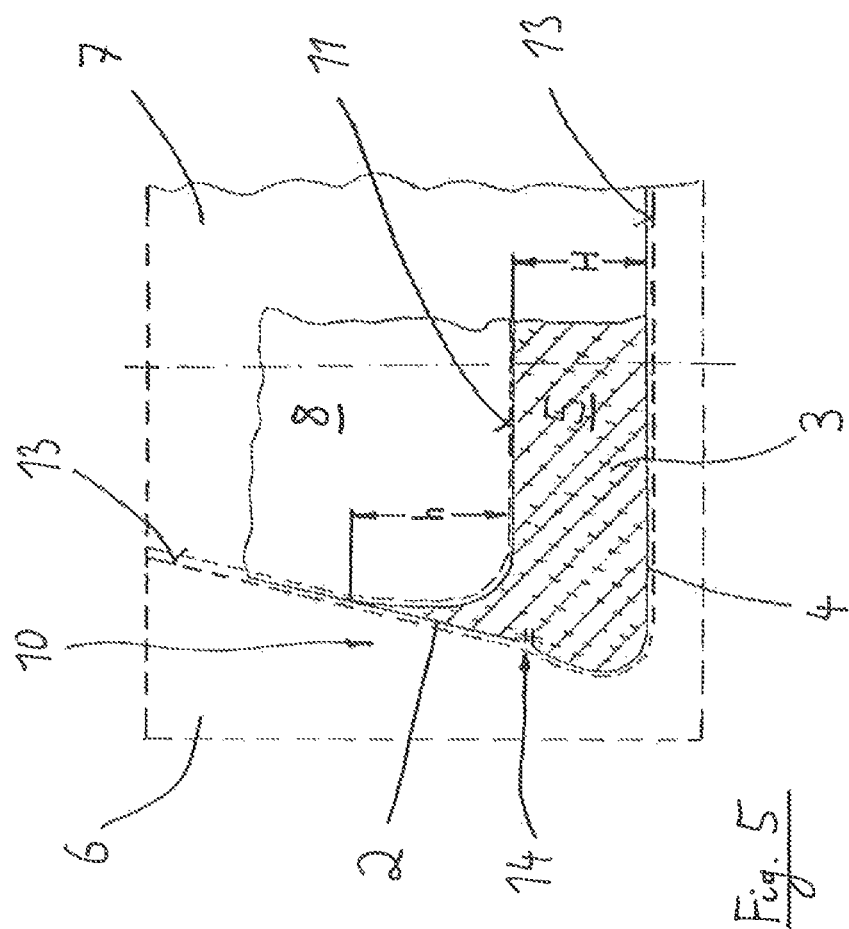

METHOD FOR PRODUCING A SHOE AND SHOE

CROSS REFERENCE TO RELATED APPLICATION

This Application is a 371 of PCT/EP2011/005580 filed on Nov. 7, 2011, which claimed the priority of German Patent Application No. 10 2010 052 783.1 filed on Nov. 30, 2010, both applications are incorporated herein by reference in their entirety.

The invention relates to a method for the production of a shoe, especially of a sport shoe, with a shoe upper and a midsole which is arranged at the shoe upper, wherein the shoe comprises an upper region and a bottom region during intended use. Furthermore, the invention relates to a shoe.

With shoes of the generic kind the outward appearance of the shoe results out of the shoe upper, on which lower region the midsole is arranged; below the midsole the outer sole is arranged again. Shoes of the generic kind with midsoles have therefore in general a strong optical separation between the leg (shoe upper) and the midsole which is aroused through the upper edge of the midsole. Also with the same inking of midsole and shoe upper that edge is silhouetted from the shoe upper due to its material thickness.

Since the midsole gives the foot the substantial hold, its retaining function is limited after such, when the midsole shall not be extended over a certain height. This is being pursued most of the time out of that reason so that the shoe doesn't appear heavy, which is the case, if the midsole reaches high.

To produce the connection between shoe upper and midsole, special connection techniques are mostly necessary, which accordingly are cost-intensive. The conglutination of midsole and shoe upper constitutes therefore a very intensive work process, which process comprises incidentally a multitude of single steps and which requires a relatively high energy input.

But high midsoles result most of the time of the utilization of anatomic formed lasts. Especially in the area of the heel there is a certain height necessary to size the round heel fully. This height is—as mentioned—though negative sometimes and causes the impression of a high weight and of disadvantageous high leverage relations at the stepping of the foot on the ground, particularly of the heel; this applies in particular in the case of running shoes.

From DE 695 03 139 T2 a method of the production of a shoes is known, whereat first of all a shoe upper will be affixed on an outer sole. The surface of the outer sole comprises a void at the side which is facing the inner of the shoe. This void is filled by injection of plastic material through the outer sole to build thus a midsole. But the problem is preserved here that the height of the midsole is limited to the sole region i.e. the midsole doesn't extend significantly above the height of the outer sole. A further similar solution shows DE 696 15 274 T2.

Thus, it is an object of the invention to suggest a method of the kind which is mentioned in the beginning and to provide a respective shoe, by which it is possible, to overcome the mentioned obstacles. Accordingly the shoe shall have a high reaching midsole in the lateral area, which gives a good hold to the foot. Nevertheless the shoe shall have an appealing outer appearance. Furthermore, the method shall enable an economical shoe manufacturing.

The solution of this object by the invention is characterized in that the method comprises the steps:

a) Production of a shoe upper of the shoe, wherein a receiving pocket is arranged at the bottom side of the shoe upper, which receiving pocket forms a receiving space for the material of the midsole which receiving space is at least substantially closed;
b) Placement of the shoe upper including the receiving pocket in a moulding tool;
c) Pouring or injecting of flowable plastic material into the receiving space of the receiving pocket to form the midsole;
d) Letting solidify of the poured or injected plastic material;
e) Demoulding of the shoe upper including receiving pocket and poured or injected midsole from the moulding tool.

During execution of step c) the receiving space of the receiving pocket is preferably delimited by a tool part in the bottom region of the shoe upper, which bottom region is arranged directly above the midsole. Here, especially a tool part is considered which has the form of a shoe last.

After the execution of step e) an outer sole can be arranged below the receiving pocket (and thus below the casted or moulded midsole). The same can be glued or injection moulded.

An alternative solution proposes that prior the execution of above step a) the receiving pocket is provided at its outer side with at least one outer sole element. The at least one outer sole element can thereby be formed, particularly molded, out of the material of the receiving pocket.

At the execution of step a) the receiving pocket will preferably be sewed on the shoe upper.

During the execution of step c) preferably a foamable plastic material will be used, particularly a foamable polyurethane material.

According to a preferred embodiment of the invention it is provided that during the execution of step c) the flowable plastic material will be poured or injected through the tool part, particularly in form of a shoe last, which limits the receiving space of the receiving pocket in the lower part of the shoe upper, immediate above the midsole.

The proposed shoe, especially designed as sport shoe, is characterized according to the invention in that a receiving pocket is arranged at the bottom side of the shoe upper, which receiving pocket comprises a receiving space for the material of the midsole which is at least substantially closed, wherein the receiving space is filled with plastic material which forms the midsole.

The receiving pocket is thereby preferably stitched on to the shoe upper.

The receiving pocket consists preferably of a thin, elastic material, which comprises a high abrasive resistance. Due to the elasticity of the material the receiving pocket can expand itself.

Furthermore, the receiving pocket can be provided with at least one outer sole element on its outer side. Thus, in this ease the receiving pocket is so designed that it functions as outer sole alter injection of the material of the midsole. Then, it is not mandatory that afterward an outer sole is arranged at the receiving pocket which is filled with the material of the midsole. The at least one outer sole element can thereby be formed, particularly molded, out of the material of the receiving pocket.

The receiving pocket needs not to be formed from a plane part, it is also possible that it consists out of several sections, which are connected to each other, especially stitched to each other.

Another possibility proposes that the receiving pocket is made and used as a parison. Accordingly, the receiving pocket is preferably injection moulded and deep-drawn. The dimensions of the receiving pocket are thereby slightly smaller than those according to the aimed final form in the shoe. Hereby, crinkles during the manufacturing can be prevented. Furthermore, a beneficial possibility of the use of a preformed receiving pocket is that it is possible herewith to provide the receiving pocket with a profile, especially the outer sole, by which a later glueing process (glueing of the outer sole) can be prevented.

To give a good hold to the foot of the wearer of the shoe a further preferred embodiment of the invention proposes that the plastic material in the lateral region of the shoe, which forms the midsole, extends over the surface of the midsole in the center of the shoe to an amount of extension, which is at least 20% of the height of the midsole in the center of the shoe, preferably at least 30% of the height of the midsole in the center of the shoe.

A shoe upper is provided according to the suggested approach, i.e. a leg (pinched or designed as a full moccasin), wherein at the shoe upper a receiving pocket is stitched underneath of it (bag or bolt), which receiving pocket consists out of an elastic material. The midsole is not pre-formed as usual and then glued together with the shoe upper, but the midsole will be formed directly on the shoe upper using the receiving pocket.

Accordingly, the receiving pocket, which is in particular baggy and sac-like respectively, will be fixed, particularly stitched, first to the shoe upper, wherein the form of the midsole will be formed only through the pouring or the injection of the flowable plastic material, by that the receiving pocket increases in its volume like a balloon and contacts the cavity walls of the moulding tool.

A predetermined quantity of preferably liquid polyurethane (two-component PU) is filled in via an opening in the receiving pocket and/or via a tool part, which foams after a short period of time and fills out the midsole receiving pocket. To receive a controlled expansion and a desired design respectively, the expansion of the polyurethane foam will be limited by an injection moulding tool.

Different advantages result out of this procedure:

First of all it is very advantageous that there is no visible transition between the shoe upper (leg) and the midsole. The optical transition will be much more defined by the connection seam between the shoe upper and the receiving pocket, which position is more or less freely chosable.

Then it is very advantageous, that no separate connection process between the shoe upper and the midsole is necessary any more (i.e. particularly no glueing process), i.e. there is no glue necessary and many processes, which partly cost a lot of energy, will be saved (pinching, napping, UV treatment of the midsole, drying of the glue, pressing on of the sole, etc.). This leads to accordant economical and ecological benefits.

The foaming polyurethane material seals the shoe upper automatically and completely towards the bottom. This allows the production of a waterproof shoe in a very low-cost way, if waterproof membranes (e.g. "Goretex") are applied.

Furthermore, due to the missing agglutination between the shoe upper and the midsole very flexible and soft shoes are obtained.

Unevenness's on the bottom of the shoe upper, which are aroused by the pinching process, will be eliminated in an advantageous way. This leads to an increased comfort of wearing of the shoe.

The bottom of the shoe upper (e.g. the sole or moccasin) can form the insole at the same time.

Since a shoe last formed tool will be preferably used for the formation of the upper region of the midsole, an anatomic foot bed will be provided which is defined through the last; at the foaming of the polyurethane material the midsole will be thus shaped optimally.

The polyurethane material, which is necessary for the suggested method, can differ in its mechanical and chemical properties from the usual used systems, because there is e.g. no protection of yellowing necessary and also the mechanical properties don't need the necessary quality as usual e.g. concerning the resistance to tear propagation. This allows on that point cost savings.

In the drawings an embodiment of the invention is depicted.

Figure 2:
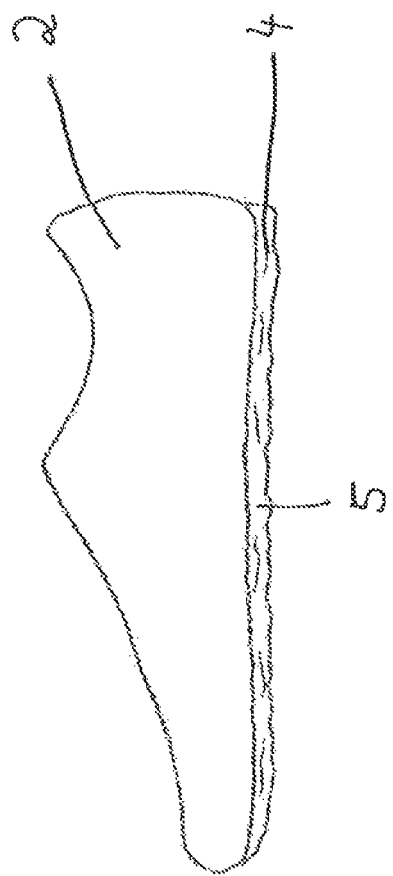
Figure 3:
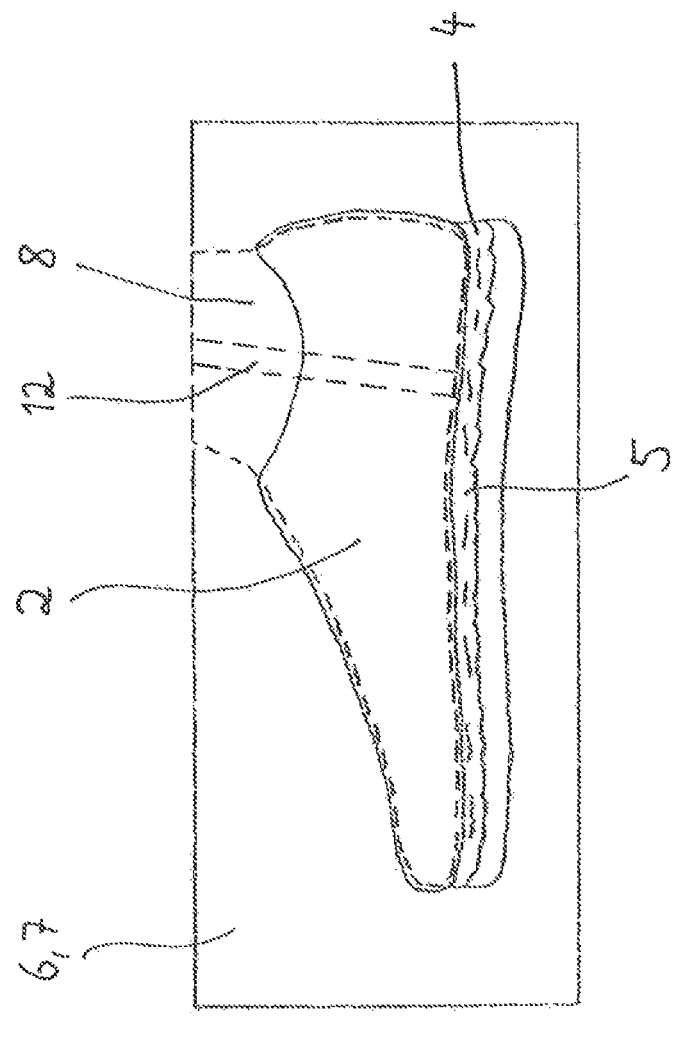

FIG. 1 shows the side view of a finished shoe,

FIG. 2 shows the side view of a shoe upper with a still empty receiving pocket which is arranged at the bottom side of the shoe upper, FIG. 3 shows a side view of an injection moulding tool, in which the shoe upper including still empty receiving pocket according to FIG. 2 is inserted prior the injection of material of the midsole, FIG. 4 shows in the depiction of FIG. 3 the injection moulding tool, wherein now the material of the midsole is injected and FIG. 5 shows the section C-D through the injection moulding tool according to FIG. 4.

In FIG. 1 the shoe 1 in form of a sport shoe is depicted which is to be produced. The shoe 1 has a shoe upper (leg) 2, on which bottom side a midsole 3 is arranged. Again on the bottom side of the midsole 3 an outer sole 9 is arranged.

The section A-B according to FIG. 1 through the shoe 1 complies to the depiction as shown in FIG. 5.

The manufacturing of the shoe according to FIG. 1 occur as following:

In a first step a receiving pocket 4 will be stitched on the bottom side of the almost finished shoe upper 2—as shown in FIG. 2. The receiving pocket consists of a thin and stretchable material. With the receiving pocket 4 the shoe upper 2 will be extensively closed on the bottom side, i.e. the receiving pocket 4 constitutes a kind of bag, which closes the shoe upper completely on the bottom side. The receiving pocket 4 constitutes a receiving space 5 for the material of the midsole 3 of the shoe.

The prepared shoe upper 2 including the receiving pocket 4 will be inserted now—according to FIG. 3—into a three-part injection molding tool. The injection molding tool consists first of two mould halfs 6 and 7 (s. for this FIG. 5), which form a mould cavity in usual manner, which complies to the form of the finished shoe.

As a third tool part a part 8 in the shape of a shoe last is provided, on which the shoe upper 2 is drawn up. In FIG. 3 and FIG. 4 this tool part 8 is depicted with a dashed line.

Now, foamable polyurethane melt is injected—according to FIG. 4—via a sprue 12 in the direction of the arrow into the receiving space 5 of the receiving pocket 4 for the production of the midsole 3. The receiving space 5 fills itself with the material of the midsole 3 due to the foaming of the polyurethane material, until the receiving pocket 4 abuts on the wall of the cavity of the injection molding tool, which is formed by the two tool parts 6 and 7. At the same time the material abuts against the last formed tool part 8.

The resulting shoe is shown in FIG. 5 in the section C-D according to FIG. 4; this section through the shoe complies also with the section A-B according to FIG. 1.

Accordingly, the material of the midsole 3 has expanded itself in such a way through the filling of the receiving space 5, so that the space is fully filled with the polyurethane material, which remains between the wall 13 of the tool and the last formed tool part 8. This has the result that it is constructively possible without any problems, to let the material of the midsole 3 rise in the lateral region 10 of the shoe over the surface 11 of the midsole 3 in the middle of the shoe. In FIG. 5 is can be seen in this connection that the midsole 3 in the lateral region 10 extends itself until a height, which is higher by an amount h than the surface 11 of the midsole 3 in the middle of the shoe.

With respect to the magnitude of this amount h it can be said, that most of the time it comes up with at least 20% of the height H of the midsole in the middle of the shoe.

The effect which can be reached herewith is well recognizable in FIG. 5: Because the receiving pocket 4 is stitched on the shoe upper 2 with a seam 14, the level of the seam 14 results as an optical visible and therefore an apparent boundary line between the shoe upper 2 and the midsole 3. The shoe receives a slender and light look.

As can be seen from the section according to FIG. 5, the midsole extends itself in fact by the amount h over the surface 11 of the midsole in the region of the middle of the shoe.

Accordingly, a much better support can be achieved for the foot of the wearer of the shoe, than which it appears to the apparent look of the shoe.

The receiving pocket 4 consists completely or partially of a thin and very stretchable material, which material joins with polyurethane (material of the midsole); on the outside it comprises a high mechanical capacity, particularly in regard to the abrasion and the adhesion of the surface.

The used polyurethane foam has a density of 0.24 to 0.5 g/cm$^3$.

The filling of the polyurethane for the midsole via the last formed part 8 of the injection molding tool is described, i.e. via the sprue 12. The pouring and injection respectively of the PU material via the bottom area is also possible alternatively or additively.

The outer sole 9 will be glued separately after the demoulding of the pre-manufactured part from the injection molding tool or it will be directly molded and injected respectively in a further process.

The seams of the shoe upper, which get in contact with the polyurethane material, as well as the textile materials are preferably sealed, to hinder an emission of the polyurethane which is not yet solidified.

A preferred procedure of the method according to the invention provides, that the finished shoe upper 2 (including midsole bag 4) will be drawn upon the last-shaped tool part 8, which is plugged detachably onto a bottom plate of the injection molding tool. The detachable connection will be chosen out of that reason, because then respective shoe uppers 2 can be lasted during the production in a parallel cycle.

The injection molding tool with its two mould halfs 6 and 7 will be closed then, wherein the mould halfs 6, 7 limit the expansion of the PU foam in all directions. A certain amount of polyurethane can be poured via a funnel into the bag 4, which funnel emerges from a closable opening in the form. The filling of the bag 4 can however also take place via the sprue 12 in the last-shaped tool part 8—as mentioned above. The sprue channel will be closed then, to prevent an effusion of the expanding PU foam. The polyurethane expands then and reacts within a certain timeframe. Then, the mould will be opened and the shoe upper including the midsole 3 and the receiving pocket 4 will be taken from the last part 8.

It is possible due to the selective expansion of the material of the midsole to let the material expand also in the area of the heel in such a way, that rear caps (heel caps) won't have to be formed separately.

In the embodiment the outer sole 9 has been attached on the bottom side of the receiving pocket 4 after the filling of the receiving pocket 4 with the material of the midsole 3. This is not compulsive necessary. An alternative possibility provides, that the receiving pocket 4 acts itself as outer sole after its filling with the material of the midsole 3, wherein it is recommended to use a material for the receiving pocket 4, which is abrasive resistant. Thereby, the receiving pocket 4 can be provided for example with a plurality of burlings, which are formed from the material of the receiving pocket 4. But it is also possible that the outer sole elements are applied, especially injected, onto the surface of the receiving pockets 4.

Furthermore, the receiving pocket can be composed of several lamellar lanes, wherein those lanes can be stitched together. Hereby it is possible to give a desired appearance to the outer shape of the shoe, while—as mentioned—the midsole will be lifted relatively high in the inner of the shoe (s. FIG. 5).

LIST OF REFERENCES

1 Shoe
2 Shoe upper
3 Midsole
4 Receiving pocket
5 Receiving Space
6, 7, 8 Moulding tool
6 Tool part
7 Tool part
8 Tool part (last part)
9 Outer sole
10 Lateral region
11 Surface of the midsole
12 Sprue
13 Wall of cavity
14 Seam
h Amount of extension
H Height of midsole
+

The invention claimed is:

1. A method for the production of a shoe with a shoe upper and a midsole which is arranged at the shoe upper, and an upper region and a bottom region during intended use, the method comprises the steps:
  a) producing a shoe upper of the shoe, wherein a receiving pocket is arranged at the bottom side of the shoe upper, the receiving pocket forms a receiving space for a material of the midsole, the receiving space is at least substantially closed, receiving pocket made of a thin, elastic material;
  b) placing the shoe upper including the receiving pocket in a moulding tool;
  c) pouring or injecting a flowable plastic material into the receiving space of the receiving pocket to form the midsole in the moulding tool, wherein the receiving pocket increases in volume, and expands when receiving the flowable plastic material, wherein the receiving space of the receiving pocket is delimited by a tool part in the bottom region of the shoe upper, and the bottom region is arranged directly above the midsole;
  d) solidifying the cured or injected plastic material;

e) demoulding the shoe upper including receiving pocket and poured or injected midsole from the moulding tool; and f) after the execution of step e). arranging an outer sole below the receiving pocket.

2. The method of claim 1, wherein at the outer face of the receiving pocket at least one outer sole element will be added. before the execution of step a).

3. The method of claim 2, wherein the at least one outer sole element is formed out of the material of the receiving pocket.

4. The method of claim 1, wherein during the execution of step a) the receiving pocket is sewed on the shoe upper.

5. The method of claim 1, wherein during the execution of step c) the flowable plastic material is a foamable polyurethane material.

6. The method of claim 1, wherein during the execution of step c), the flowable plastic material is poured or injected through the tool part which limits the receiving space of the receiving pocket in the lower part of the shoe upper, immediate above the midsole.

* * * * *